(12) United States Patent
Huang et al.

(10) Patent No.: US 8,954,626 B2
(45) Date of Patent: Feb. 10, 2015

(54) TRANSMISSION SYSTEM AND METHOD THEREOF

(75) Inventors: Hsien-Po Huang, New Taipei (TW); Hao-Hsuan Chiu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 547 days.

(21) Appl. No.: 13/364,529

(22) Filed: Feb. 2, 2012

(65) Prior Publication Data
US 2013/0013819 A1    Jan. 10, 2013

(30) Foreign Application Priority Data

Jul. 6, 2011 (TW) .............................. 100123826 A

(51) Int. Cl.
G06F 3/00 (2006.01)
H04L 12/54 (2013.01)

(52) U.S. Cl.
CPC ..................................... H04L 12/56 (2013.01)
USPC .......................................................... 710/15

(58) Field of Classification Search
None
See application file for complete search history.

(56) References Cited

U.S. PATENT DOCUMENTS

| 7,697,500 B2 | 4/2010 | Mizukoshi | |
|---|---|---|---|
| 2005/0120157 A1* | 6/2005 | Chen et al. | 710/313 |
| 2008/0008154 A1* | 1/2008 | Mizukoshi | 370/347 |

FOREIGN PATENT DOCUMENTS

| CN | 1405657 | 3/2003 |
|---|---|---|
| CN | 1797382 | 7/2006 |

OTHER PUBLICATIONS

English language translation of abstract of CN 1405657 (published Mar. 26, 2003).
English language translation of abstract of CN 1797382 (published Jul. 5, 2006).

* cited by examiner

Primary Examiner — Idriss N Alrobaye
Assistant Examiner — Dayton Lewis-Taylor
(74) Attorney, Agent, or Firm — McClure, Qualey & Rodack, LLP

(57) ABSTRACT

A transmission system receiving a first token packet and a second token packet is disclosed. The transmission system is coupled to a first peripheral device and a second peripheral device. The transmission system includes an upstream port to receive the first and the second token packets. A first transmission path occurs between the upstream port and the first peripheral device. A second transmission path occurs between the upstream port and the second peripheral device. The transmission system analyzes the first and the second token packets. The first token packet includes information corresponding to the first peripheral device. When the second token packet includes information corresponding to the first peripheral device, the transmission system disables the second transmission path.

16 Claims, 5 Drawing Sheets

TRANSMISSION SYSTEM AND METHOD THEREOF

CROSS REFERENCE TO RELATED APPLICATIONS

This Application claims priority of Taiwan Patent Application No. 100123826, filed on Jul. 6, 2011, the entirety of which is incorporated by reference herein.

BACKGROUND OF THE INVENTION

1. Field of the Invention

The invention relates to a transmission system, and more particularly to a transmission system for receiving a plurality of token packets.

2. Description of the Related Art

When a transmission system (e.g. a hub) transmits packets between a host device and peripheral devices, the hub device utilizes a Broadcast method to transmit the packets to each connection port of the hub device. Since the hub device cannot immediately determine which connection port the packets should be transmitted to and cannot immediately determine which connection port may send response back to the hub device, power of transmitters of all connection ports are continuously provided such that power consumption of the hub device cannot be reduced.

BRIEF SUMMARY OF THE INVENTION

In accordance with an embodiment, a transmission system, which receives a first token packet and a second token packet, comprises an upstream port, a first downstream port, a second downstream port and a processing module. The upstream port receives the first and the second token packets. The first downstream port is coupled to a first peripheral device. The second downstream port is coupled to a second peripheral device. The processing module is coupled between the upstream port and the first downstream port, and coupled between the upstream port and the second downstream port. The processing module comprises a transmission unit and a control unit. The transmission unit provides a first transmission path between the upstream port and the first peripheral device and provides a second transmission path between the upstream port and the second peripheral device. The control unit is coupled to the upstream port and the transmission unit to analyze the first token packet and the second token packet. The first token packet comprises information corresponding to the first peripheral device. The control unit controls the transmission unit to disable the second transmission path when the second token packet comprises the information corresponding to the first peripheral device.

A transmission method for a transmission system is provided. The transmission system comprises an upstream port and a processing module to transmit a first token packet and a second token packet. A first transmission path is provided between the upstream port and a first peripheral device. A second transmission path is provided between the upstream port and a second peripheral device. The transmission method comprises: receiving the first token packet and the second token packet via the upstream port; utilizing the processing module to analyze the first token packets and the second token packet, wherein, the first token packet comprises information corresponding to the first peripheral device; and disabling the second transmission path by the processing module when the second token packet comprises the information corresponding to the first peripheral device.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
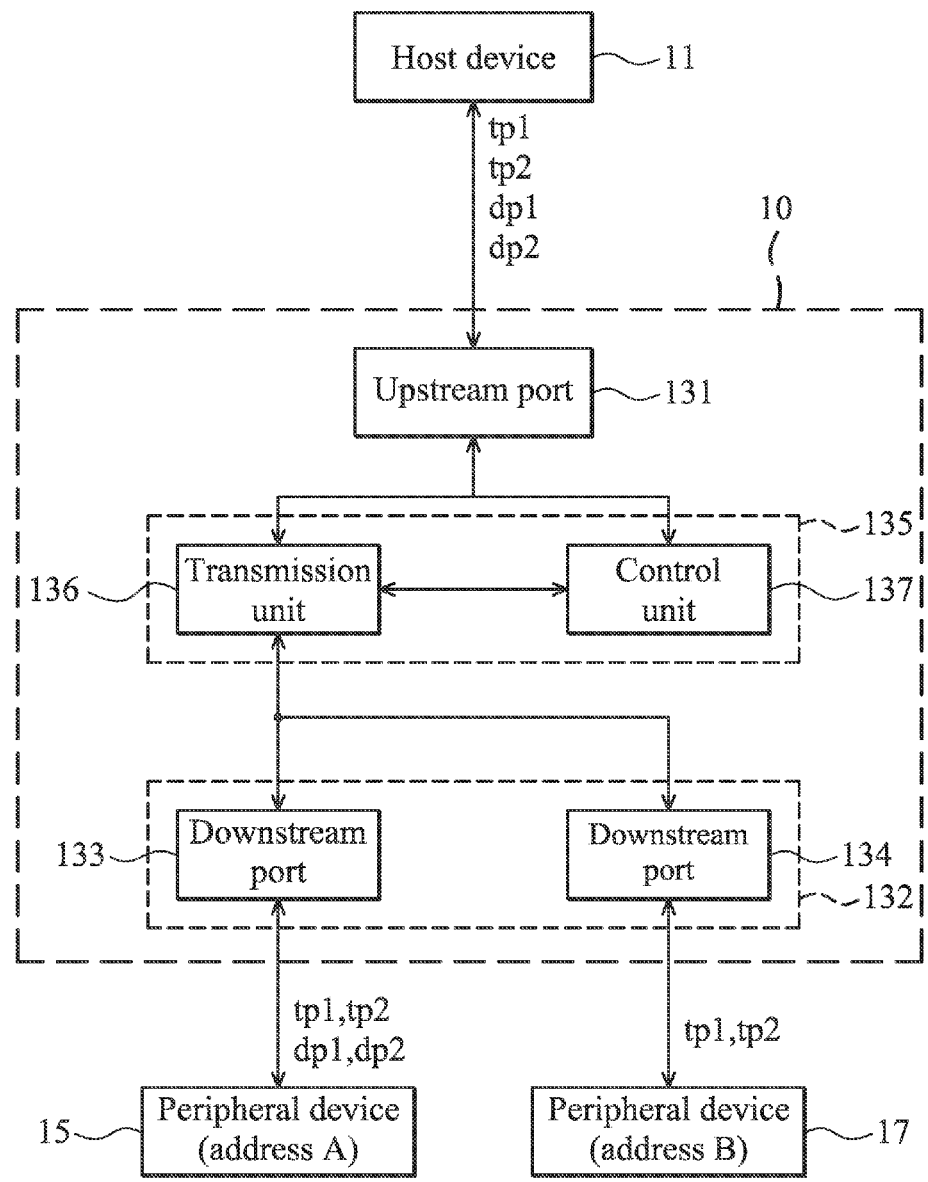
FIG. 1 is a schematic diagram of an exemplary embodiment of a transmission system of the invention.

FIG. 1 is a schematic diagram of an exemplary embodiment of a transmission system of the invention. In this embodiment, the transmission system 10 is a Universal Serial Bus (USB) hub. As shown in FIG. 1, the transmission system 10 is capable of receiving token packets tp1 and tp2 transmitted from a host device 11. In this embodiment, the host device 11 may communicate with a peripheral device 15 or 17 via the transmission system 10. A transaction communicated between the host device 11 and the peripheral device 15 or 17 usually comprises a token packet, a data packet and a handshake packet. In other embodiments, the transaction only comprises a token packet and a handshake packet.

By the transmission system 10 of the present invention, the host device 11 is capable of implementing an OUT transaction or an IN transaction with a plurality of peripheral devices (such as peripheral device 15 or 17). The host device 11 is further capable of implementing a SET transaction or a PING transaction to set or detect the states of the peripheral devices (such as peripheral device 15 or 17).

In this embodiment, the host device 11 transmits the token packet tp1 during a first token period tp1 and transmits the token packet tp2 during a second token period which occurs later than the first token period tp1.

The transmission system 10 comprises an upstream port 131, a downstream module 132 and a processing module 135. The upstream port 131 is coupled to the host device 11 to receive the token packets tp1 and tp2. The downstream module 132 comprises downstream ports 133 and 134. The downstream port 133 is coupled to the peripheral device 15. The downstream port 134 is coupled to the peripheral device 17.

The processing module 135 is coupled between the upstream port 131 and the downstream module 132 and comprises a transmission unit 136 and a control unit 137. The transmission unit 136 provides a first transmission path between the upstream port 131 and the peripheral device 15, and provides a second transmission path between the upstream port 131 and the peripheral device 17.

The control unit 137 is coupled to the upstream port 131 and the transmission unit 136 to receive and analyze the token packets tp1 and tp2. In one embodiment, if the host device 11 desires to implement an OUT transaction for the peripheral device 15, the host device 11 may transmit the token packet tp1 to the peripheral device 15 via the transmission system 10 during a first token period. At this time, the token packet tp1 comprises information corresponding to the peripheral device 15. Preferably, the information is address information corresponding to the peripheral device 15.

After receiving the token packet tp1, the token packet tp1 is firstly analyzed by the control unit 137 in a decoding method and then broadcasted to the peripheral devices 15 and 17. Since the token packet tp1 comprises the information corresponding to the peripheral device 15 and does not comprise information corresponding to the peripheral device 17, a handshake packet sp1 is transmitted only from the corresponding peripheral device 15 to the transmission system 10 for indicating that a data packet of the OUT transaction is accepted by the corresponding peripheral device 15. Then the transmission system 10 transmits the handshake packet sp1 from the peripheral device 15 to the host device 11. The control unit 137 may record the information of the token packet tp1 and a port number of the downstream port 133, wherein the recorded information corresponds to the peripheral device 15 and the downstream port 133 is coupled to the peripheral device 15.

After transmitting the token packet tp1, the host device 11 may transmit the token packet tp2 to the peripheral device 15 or the peripheral device 17 via the transmission system 10 for performing another transaction. The control unit 137 may analyze the token packet tp2. When the analyzed token packet tp2 comprises the information corresponding to the peripheral device 15, the control unit 137 may control the transmission unit 136 to disable the second transmission path between the upstream port 131 and the peripheral device 17. It is noted that the first transmission path between the upstream port 131 and the peripheral device 15 is still enabled because the analyzed token packet tp2 comprising the information corresponding to the peripheral device 15 is the same as the information corresponding to the peripheral device 15 of the token packet tp1. In one embodiment, the control unit 137 turns off a power provided to a transmitter of the second transmission path to disable the second transmission path. For the USB 2.0 standard, the power provided to the transmitter is electrical power supplement on a USB 2.0 differential pair (D+, D−). For the USB 3.0 standard, the power provided to the transmitter is electrical power supplement on a USB 3.0 differential pair (D+, D−), USB 3.0 high-speed receiving differential pair (StdA_SSRX+, StdA_SSRX−), and/or USB 3.0 high-speed transmitting differential pair (StdA_SSTX+, StdA_SSTX−).

For example, the control unit 137 may analyze the token packet tp1 to obtain address information corresponding to an address data segment of the token packet tp1 during a first token period, and record the analyzed result, or the address information corresponding to the address data segment of the token packet tp1. In this period (the first token period), the control unit 137 controls the transmission unit 136 to enable the first transmission path and the second transmission path. Thus, the token packet tp1 has been transmitted to the peripheral devices 15 and 17. However, only one peripheral device, which corresponds to the token packet tp1, transmits a response according to the token packet tp1. Additionally, when two transmission paths and two peripheral devices are described in the above embodiment, it should be appreciated that the number of the transmission paths or the peripheral devices does not be limited to two, but may be greater in number for other embodiments. In some embodiments, the numbers of the transmission paths and the peripheral devices are more than three. In this case, all transmission paths are enabled to transmit the token packet tp1 and only one peripheral device corresponding to the token packet tp1 transmits a response according to the token packet tp1.

In this embodiment, an address of the peripheral device 15 matches with the address information corresponding to the address data segment of the token packet tp1. Thus, the peripheral device 15 communicates with the host device 11 via the first transmission path provided by the transmission unit 136 according to the token packet tp1 during a first data period which is occurs later than the first token period. In one embodiment, the peripheral device 15 receives a data packet (OUT transaction) from the host device 11 or provides a data packet (IN transaction) to the host device 11 according to the token packet tp1. After receiving the data packet from the host device 11, the peripheral device 15 transmits a handshake packet to the host device 11 during a handshake period which occurs later than the first data period. The host device 11 determines that the OUT transaction is finished according to the handshake packet provided by the peripheral device 15. In other embodiments, when the data packet provided by the peripheral device 15 is received by the host device 11, the host device 11 transmits a handshake packet to the peripheral device 15 during a handshake period which occurs later than the first data period. The peripheral device 15 determines that the IN transaction is finished according to the handshake packet provided by the host device 11.

In this embodiment, the transmission unit 136 informs transmission states of the first transmission path and the second transmission path to the control unit 137 after transmitting the token packet tp1. The control unit 137 records the information provided by the transmission unit 136 subsequently. The recorded information may comprise information corresponding to the peripheral device 15 and a port number of the downstream port 133 coupled to the peripheral device 15.

The control unit 137 may analyze the token packet tp2 to obtain address information corresponding to an address data segment of the token packet tp2 during a second token period which occurs later than the first token period. It is worthy to note that the first transmission path and the second transmission path are enabled during the second token period. Then, the control unit 137 may compare a first analyzed result with a second analyzed result, wherein the first analyzed result is generated via analyzing the token packet tp1 during the first token period, and the second analyzed result is generated via analyzing the token packet tp2 during the second token period.

In one embodiment, if the address information corresponding to the address data segment of the token packet tp2 is the same as the address information of the peripheral device 15, it indicates that the second analyzed result matches with the first analyzed result. Thus, the host device 11 still communicates with the peripheral device 15 via the first transmission path. At this time, the control unit 137 controls the transmission unit 136 to disable the second transmission path because no data has been transmitted via the second transmission path after the second token period. Since power of the second transmission path, which hasn't transmitted data, is disabled, power consumption of the transmission system 10 can be reduced.

In another embodiment, if the address information corresponding to the address data segment of the token packet tp2 is not the same as the address information of the peripheral device 17, it indicates that the second analyzed result does not match with the first analyzed result. At this time, the control unit 137 controls the transmission unit 136 to enable the first transmission path and the second transmission path during a second data period. However, only the second transmission path transmits data. The transmission unit 136 informs the control unit 137 that the transmission states of the first transmission path and the second transmission path after transmitting the token packet tp2.

From the previously description, the control unit 137 may disable a non-corresponding transmission path, which hasn't transmitted data after receiving the token packet, according to the information informed by the transmission unit 136 and a next analyzed result of the information, while the related information of a corresponding transmission path is previous recorded in the control unit 137. The power consumption of the transmission system 10 can be reduced by disabling transmitter and/or receiver of the non-corresponding transmission path.

In addition, when the token packet tp1 or tp2 comprises information corresponding to the transmission system 10 (e.g. but information), the control unit 137 controls the transmission unit 136 to disable the first transmission path and the second transmission path, simultaneously.

Figure 2A:
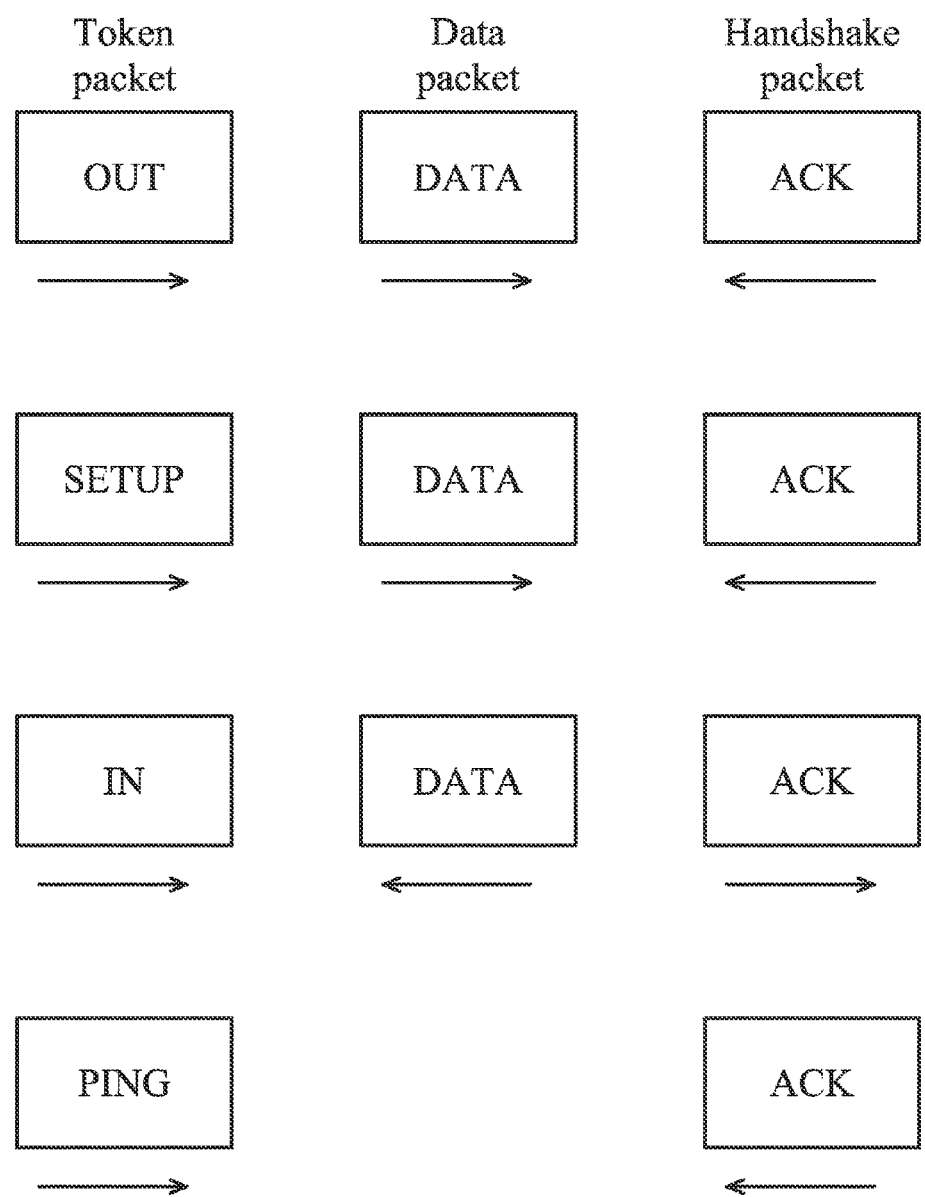
FIG. 2A is a schematic diagram of an exemplary embodiment of transactions transmitted between a host device and a transmission system.

FIG. 2A is a schematic diagram of an exemplary embodiment of transactions transmitted between the host device 11 and the transmission system 10. The transactions transmitted between the host device 11 and the transmission system 10 comprise an OUT transaction, a SET transaction, an IN transaction and a PING transaction.

Each of the OUT transaction, the SET transaction and the IN transaction comprises a token packet, a data packet and a handshake packet. The PING transaction only comprises a token packet and a handshake packet. The PING transaction does not comprise a data packet.

When the host device 11 performs an OUT transaction or a SET transaction to provide data to a corresponding peripheral device, the host device 11 may sequentially transmit a token packet and a data packet to the corresponding peripheral device via the transmission system 10. After receiving the data packet, the corresponding peripheral device may respond with a handshake packet to the host device 11 to represent that the OUT transaction or the SET transaction is finished.

When the host device 11 performs an IN transaction to retrieve data from a corresponding peripheral device, the host device 11 may first transmit a token packet, and then receive a data packet provided by the corresponding peripheral device and finally transmit a handshake packet to the peripheral device.

When the host device 11 performs a PING transaction to inquire whether a corresponding peripheral device can receive data because the registers of the peripheral device may be filled with data, the host device 11 may first transmit a token packet and receive a handshake packet provided by the corresponding peripheral device.

Figure 2B:
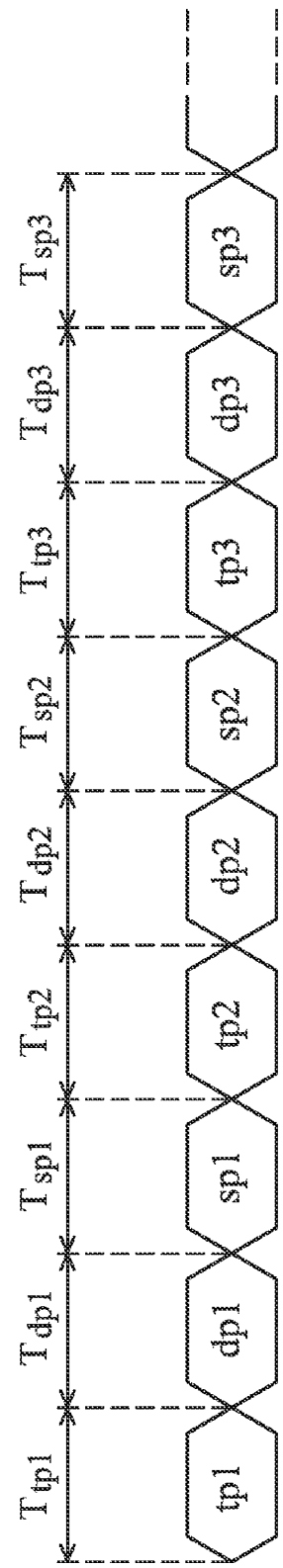
FIG. 2B is a timing diagram of an exemplary embodiment of token periods, data periods and handshake periods.

For brevity, the operating of an OUT transaction is given as an example and described in greater detail with reference to FIG. 1. The sequence of the periods (e.g. token periods, data periods and handshake periods) is shown in FIG. 2B. Assume that the peripheral device 15 is coupled to the downstream port 133, the peripheral device 17 is coupled to the downstream port 134, the address of the peripheral device 15 is address A, and the address of the peripheral device 17 is address B.

Refer to FIG. 2B, during a first token period $T_{tp1}$, the host device 11 transmits a token packet tp1 to the peripheral devices 15 and 17 via the transmission system 10. The control unit 137 controls the transmission unit 136 to enable the first transmission path and the second transmission path during the first token period $T_{tp1}$. Thus, the token packet tp1 is broadcasted to the peripheral devices 15 and 17 through the first transmission path and the second transmission path respectively.

In this embodiment, the control unit 137 analyzes the token packet tp1 to obtain address information corresponding to an address data segment of the token packet tp1. The address information represents that the host device 11 desires to communicate with the peripheral device 15 or 17. Assume that the control unit 137 analyzes the token packet tp1 to generate a first analyzed result and the address information corresponding to the address data segment of the token packet tp1 (i.e. the first analyzed result) is the address A.

Since the address corresponding to the peripheral device 15 matches with the address information of the address data segment of the token packet tp1, the peripheral device 15 receives a data packet dp1 transmitted from the host device 11 via the first transmission path provided by the transmission unit 136 during a first data period $T_{dp1}$. At this time, the peripheral device 17 does not communicate with the host device 11 via the second transmission path.

After receiving the data packet dp1, the peripheral device 15 responds with a handshake packet sp1 to the host device 11 during a first handshake period $T_{sp1}$ which occurs later than the first data period $T_{dp1}$. During the first data period $T_{dp1}$ and the first handshake period $T_{sp1}$, the control unit 137 controls the transmission unit 136 to enable the first transmission path and the second transmission path. However, only the first transmission path implements a transmission action.

In this embodiment, the transmission unit 136 monitors transmission states of the first transmission path and the second transmission path during the first data period $T_{dp1}$ or the first handshake period $T_{sp1}$, and informs the transmission states to the control unit 137. The control unit 137 determines that the peripheral device 15 is coupled to the downstream port 133 according to the first analyzed result and the transmission state provided by the transmission unit 136.

During a second token period $T_{tp2}$, the host device 11 transmits another token packet tp2 to the peripheral devices 15 and 17 via the transmission system 10. At this time, the control unit 137 controls the transmission unit 136 to still enable the transmission path first and the second transmission path. The control unit 137 analyzes the token packet tp2 to obtain address information corresponding to an address data segment of the token packet tp2. After analyzing the token packet tp2, a second analyzed result is generated to be compared with the first analyzed result by the control unit 137.

Assume that the address information corresponding to the address data segment of the token packet tp2 is the address B. Since the second analyzed result (address B) generated in the second token period $T_{tp2}$ is different from the first analyzed result (address A) generated in the first token period $T_{tp1}$, neither the first transmission path nor the second transmission path will be disabled during a second data period $T_{dp2}$ and a second handshake period $T_{sp2}$. In one embodiment, the control unit 137 stores the second analyzed result and the transmission state of the second transmission path into a memory unit of the transmission system 10. Preferably, the memory unit is a register.

Contrarily, assume that the second analyzed result generated in the second token period $T_{tp2}$ is the same as the first analyzed result (address A) generated in the first token period $T_{tp1}$. In other words, the address information corresponding to the address data segment of the token packet tp1 is the same as the address information corresponding to the address data segment of the token packet tp2. The control unit 137 controls the transmission unit 136 to disable the second transmission path. Thus, only the first transmission path is enabled and the second transmission path is disabled by the control unit 137 during the second data period $T_{dp2}$ and the second handshake period $T_{sp2}$.

Since the first transmission path is enabled, the peripheral device 15 continues to communicate with the host device 11 via the first transmission path after the second token period $T_{tp2}$. In one embodiment, a data packet dp2 or a handshake packet sp2 has been transmitted between the host device 11 and the peripheral device 15. However, the electrical power provided to a transmitter/receiver of the second transmission path can be disabled for disabling the second transmission path. Thus, the power consumption of the transmission system 10 is reduced.

During a third token period $T_{tp3}$ which occurs later than the second token period $T_{tp2}$, the host device 11 transmits a token packet tp3 to the peripheral device 15 or 17 via the transmission system 10. The control unit 137 analyzes an address data segment of the token packet tp3 to generate a third analyzed result. The control unit 137 determines whether the address information corresponding to the address data segment of the token packet tp3 matches with the address information corresponding to the address data segment of the token packet tp2.

If the third analyzed result generated in the third token period $T_{tp3}$ is different from the second analyzed result generated in the second token period $T_{tp2}$, the control unit 137 enables the first transmission path and the second transmission path during a third data period $T_{dp3}$ and a third handshake period $T_{sp3}$. In this embodiment, the transmission unit 136 informs the transmission states of the first and the second transmission paths to the control unit 137.

On the contrary, if the third analyzed result generated in the third token period $T_{tp3}$ is the same as the second analyzed result generated in the second token period $T_{tp2}$, the control unit 137 will disable the first transmission path or the second transmission path during the third data period $T_{dp3}$ and the third handshake period $T_{sp3}$ according to the transmission states of the first transmission path and the second transmission path during the second data period $T_{dp2}$ or the second handshake period $T_{sp2}$.

For example, if the first transmission path implements a transmission action and the second transmission path does not implement the transmission action during the second data period $T_{dp2}$ or the second handshake period $T_{sp2}$, the control unit 137 disables the second transmission path during the third data period $T_{dp3}$ and the third handshake period $T_{sp3}$.

Contrarily, if the second transmission path implements the transmission action and the first transmission path does not implement the transmission action during the second data period $T_{dp2}$ or the second handshake period $T_{sp2}$, the control unit 137 disable the first transmission path during the third data period $T_{dp3}$ and the third handshake period $T_{sp3}$.

Figure 3:
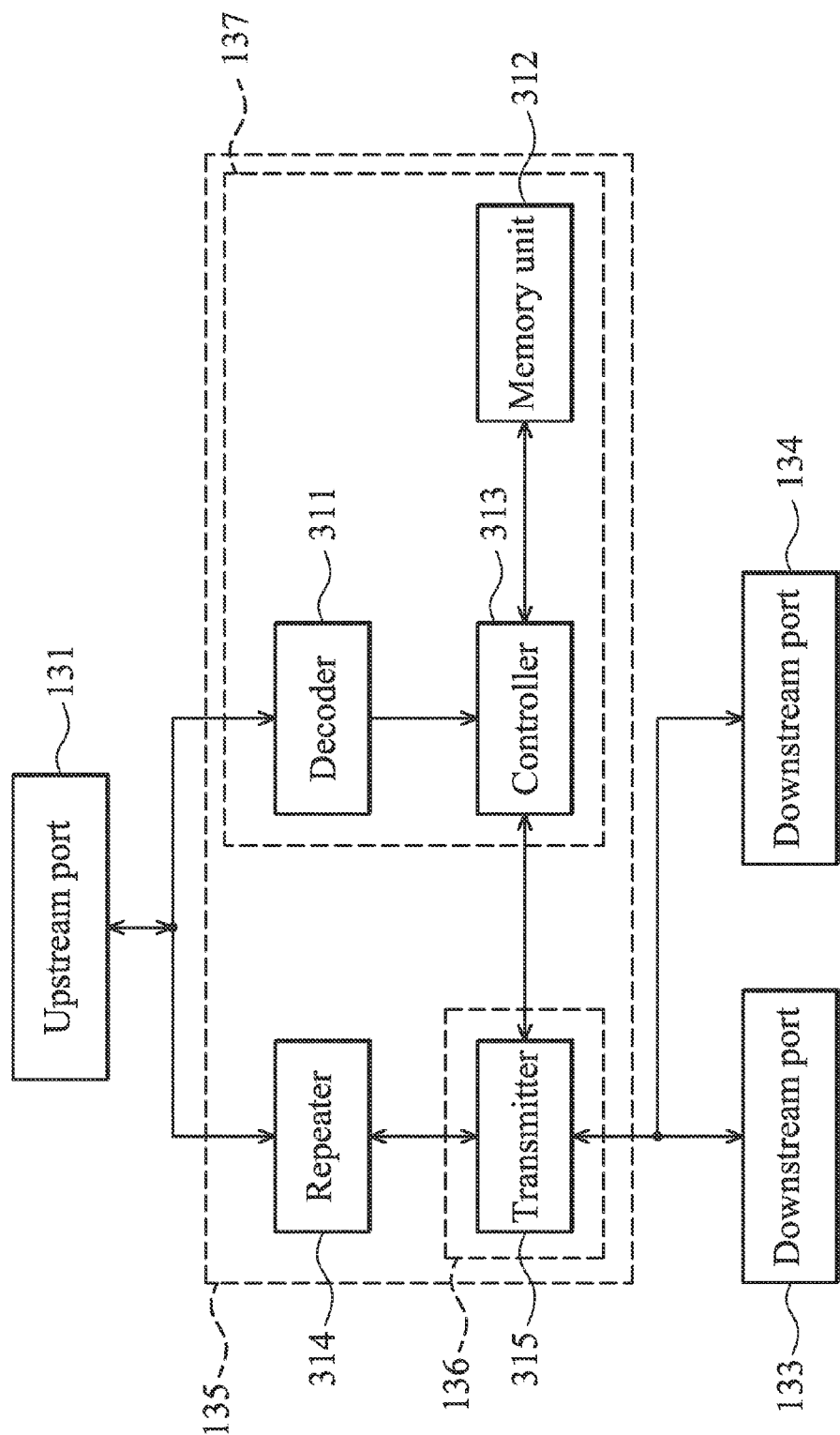
FIG. 3 is a schematic diagram of an exemplary embodiment of a processing module of the invention.

In one embodiment, the processing module 135 comprises the memory unit 312 as shown in FIG. 3. The processing module 135 receives a first handshake packet sp1 via the downstream port 133 during a first handshake period $T_{sp1}$ which occurs later than the first token period $T_{tp1}$. After receiving the first handshake packet sp1, the first analyzed result and the information (e.g. the port number) of the downstream port 133 are stored in the memory unit 312.

FIG. 3 is a schematic diagram of an exemplary embodiment of the processing module of the invention. The processing module 135 comprises a transmission unit 136, a control unit 137 and a repeater 314. In this embodiment, the transmission unit 136 is a transmitter 315, such as an analog switch, but the disclosure is not limited thereto. Any circuit or device can serve the transmission unit 136, as long as the circuit or device is capable of enabling or disabling the transmission paths.

The repeater 314 repeats information received from the upstream port 131 to generate a repeated result and the repeated result is transmitted to the downstream ports 133 and 134 via the first transmission path and the second transmission path provided by the transmission unit 136. For example, the repeater 314 repeats the token packet tp1 to generate a first repeated result during the first token period, and the transmission unit 136 transmits the first repeated result to the peripheral devices 15 and 17 via the first transmission path and the second transmission path respectively. The repeater 314 repeats the token packet tp2 to generate a second repeated result during the second token period, and the transmission unit 136 transmits the second repeated result to the peripheral devices 15 and 17 via the first transmission path and the second transmission path respectively.

In this embodiment, the control unit 137 comprises a decoder 311, a memory unit 312 and a controller 313. The decoder 311 decodes and analyzes the token packet tp1 to generate a first decoded result (i.e. the first analyzed result mentioned above) during the first token period. The decoder 311 decodes and analyzes the token packet tp2 to generate a second decoded result (i.e. the second analyzed result mentioned above) during the second token period. The memory unit 312 is configured to store the first decoded result, the transmission states of the first and the second transmission paths informed by the transmission unit 136.

The controller 313 compares the second decoded result and the first decoded result stored in the memory unit 312, and controls the transmitter 315 to disable the first transmission path or the second transmission path according to the compared result and the stored transmission states.

The processing module 135 of the transmission system 10 is capable of storing the current transmission state and analyzing the corresponding address information of the token packet. If next address information of a next token packet of a next transaction transmitted from a host device matches with the previous address information of a previous token packet, an electrical power of a transmitter/receiver of a non-corresponding transmission path is disabled according to the previous transmission states of the transmission paths. On the contrary, if the next address information of the next token packet of the next transaction transmitted from the host device does not match with the previous address information of the previous token packet, the current transmission state and the address information of the current token packet are stored and the electrical powers for all transmitter/receiver of all transmission paths are enabled. Since the transmitters/receivers of the transmission paths do not continuously receive power, the power consumption of the transmission system 10 can be reduced. Additionally, while two transmission paths and two peripheral devices are taken as an example, it should be appreciated that the numbers of the transmission paths and peripheral devices need not be limited to two. In other embodiments, if the numbers of the transmission paths and peripheral devices are more than three, the transmission system is capable of providing a power to a corresponding transmission path, which is required to implement a transmission action, and is capable of stopping to provide power to other transmission paths, which are not required to implement the transmission action. Thus, it can be achieved that the power consumption of the transmission system 10 is reduced.

Figure 4:
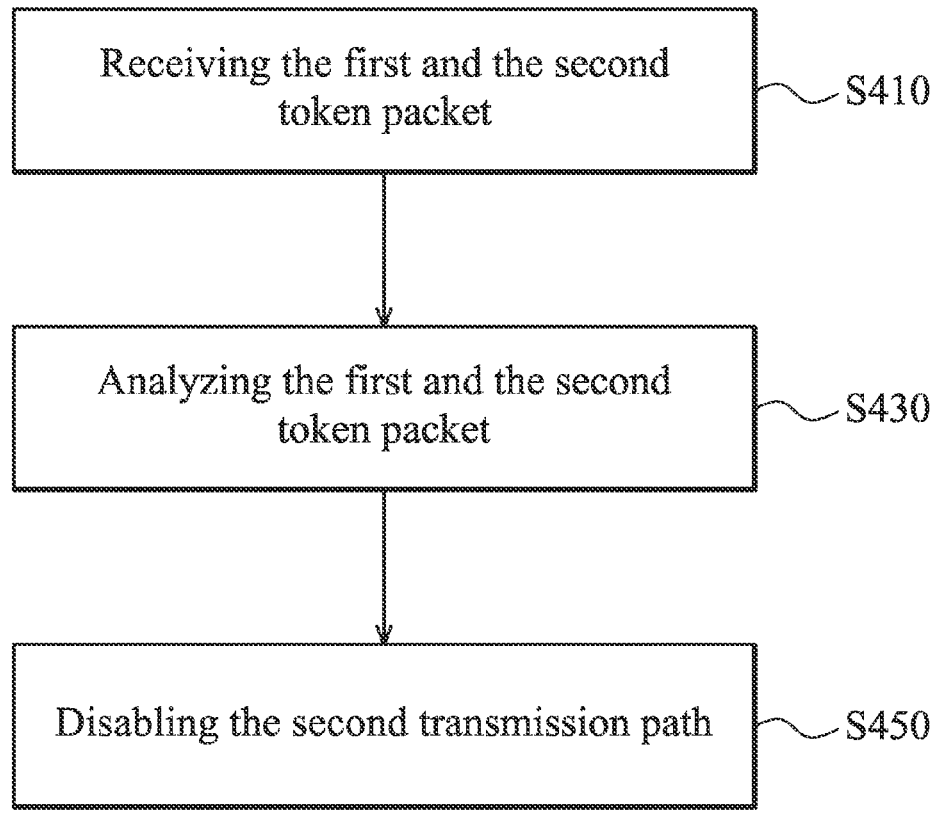
FIG. 4 is a flowchart of an exemplary embodiment of a transmission method of the invention.

FIG. 4 is a flowchart of an exemplary embodiment of a transmission method of the invention. The transmission method is applied to a transmission system. The transmission system is configured to transmit a first token packet and a second token packet between a host device and plural peripheral devices. The transmission system comprises an upstream port and a processing module. A first transmission path occurs between the processing module and a first peripheral device. A second transmission path occurs between the processing module and a second peripheral device.

First, a first token packet and a second token packet are received (step S410). In this embodiment, when receiving the first and the second token packets, the first transmission path and the second transmission path are enabled. The first token packet is received during a first token period and repeated to generate a first repeated result. The first repeated result is transmitted to the first peripheral device via the first transmission path and transmitted to the second peripheral device via the second transmission path. In this case, a host device utilizes the first token packet and the second token packet to communicate with the first peripheral device or the second peripheral device.

During a first data period which occurs later than the first token period, the host device may communicate with the first peripheral device via the first transmission path when the first token packet comprising information corresponding to the first peripheral device. In one embodiment, if the host device performs an OUT transaction, a SET transaction or an IN transaction via the transmission system, a handshake transmission is performed between the host device and the transmission system for transmitting a handshake packet during a first handshake period which occurs later than the first data period. In other embodiments, if a PING transaction is performed between the host device and the transmission system, only a token packet and a handshake packet are transmitted between the host device and the transmission system.

During a second token period which occurs later than the first data period or the first handshake period, the second token packet is received. Then, the second token packet is repeated to generate a second repeated result. The second repeated result is transmitted to the first peripheral device via the first transmission path and transmitted to the second peripheral device via the second transmission path. In this embodiment, the first token period is prior to the first data period. The first data period is prior to the second token period.

The first token packet and the second token packet are analyzed (step S430). In one embodiment, a first handshake packet is received via the first transmission path or the second transmission path during a first handshake period which occurs later than the first token period. After analyzing the first token packet, a first analyzed result is generated. The first analyzed result and the transmission path, which transmits the first handshake packet, are stored. In one embodiment, the first token packet comprises information corresponding to the first peripheral device.

When the second token packet comprises the information corresponding to the first peripheral device, the second transmission path is disabled (step S450). For example, after analyzing the first token packet, the first analyzed result is generated. After analyzing the second token packet, a second analyzed result is generated. When the first analyzed result matches with the second analyzed result, the second transmission path is disabled.

In one embodiment, if the first analyzed result does not match with the second analyzed result, the second analyzed result and the transmission state of the second transmission path are stored. In another embodiment, if the second token packet comprises information corresponding to the transmission system, the first transmission path and the second transmission path are both disabled.

In some embodiments, a third token packet is received and analyzed after step S450. If the third token packet comprises the information corresponding to the second peripheral device, the second transmission path is enabled.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission system capable of receiving a first token packet and a second token packet, comprising:
    an upstream port receiving the first token packet and the second token packet;
    a first downstream port coupled to a first peripheral device;
    a second downstream port coupled to a second peripheral device; and
    a processing module coupled between the upstream port and the first downstream port, and coupled between the upstream port and the second downstream port, and comprising:
    a transmission unit providing a first transmission path between the upstream port and the first peripheral device, and providing a second transmission path between the upstream port and the second peripheral device; and
    a control unit coupled to the upstream port and the transmission unit to analyze the first token packet and the second token packet, wherein the first token packet comprises information corresponding to the first peripheral device,
    wherein the control unit controls the transmission unit to disable the second transmission path when the second token packet comprises the information corresponding to the first peripheral device,
    wherein the upstream port receives the first token packet during a first token period and receives the second token packet during a second token period, and the second token period occurs later than the first token period, and
    wherein the processing module further comprises a repeater, and the repeater generates a first repeated result by repeating the first token packet during the first token period and transmits the first repeated result to the first peripheral device and the second peripheral device via the first transmission path and the second transmission path respectively, and the repeater generates a second repeated result by repeating the second token packet during the second token period and transmits the second repeated result to the first peripheral device and the second peripheral device via the first transmission path and the second transmission path respectively.

2. The transmission system as claimed in claim 1, wherein the control unit generates a first analyzed result by analyzing the first token packet and then generates a second analyzed result by analyzing the second token packet, and compares the first analyzed result with the second analyzed result, and the control unit controls the transmission unit to disable the second transmission path when the first analyzed result matches with the second analyzed result.

3. The transmission system as claimed in claim 2, wherein the control unit stores the second analyzed result and information relating to the second downstream port in a memory unit of the processing module when the first analyzed result does not match with the second analyzed result.

4. The transmission system as claimed in claim 1, wherein the processing module further comprises a memory unit, and the processing module receives a first handshake packet via the first downstream port during a first handshake period occurring later than the first token period and generates a first analyzed result by analyzing the first token packet, and the processing module stores the first analyzed result and information relating to the first downstream port in the memory unit after receiving the first handshake packet.

5. The transmission system as claimed in claim 1, wherein the first and the second token packets are transmitted from a host device, and the host device communicates with the first peripheral device via the first transmission path during a first data period, and the first data period occurs later than the first token period and prior to the second token period.

6. The transmission system as claimed in claim 1, wherein the upstream port further receives a third token packet, and the control unit analyzes the third token packet, and the control unit controls the transmission unit to enable the second transmission path when the third token packet comprises information corresponding to the second peripheral device.

7. The transmission system as claimed in claim 1, wherein the control unit controls the transmission unit to disable the first transmission path and the second transmission path when the second token packet comprises information corresponding to the transmission system.

8. The transmission system as claimed in claim 1, wherein the first transmission path is enabled when the upstream port receives the first token packet or the second token packet.

9. A transmission method for a transmission system comprising an upstream port and a processing module, the transmission system being configured to transmit a first token packet and a second token packet, wherein a first transmission path is provided between the upstream port and a first peripheral device, and a second transmission path is provided between the upstream port and a second peripheral device, the transmission method comprising:
receiving the first token packet and the second token packet via the upstream port;
utilizing the processing module to analyze the first and the second token packets, wherein the first token packet comprises information corresponding to the first peripheral device,
disabling the second transmission path by the processing module when the second token packet comprises the information corresponding to the first peripheral device, wherein the first token packet is received during a first token period, the second token packet is received during a second token period, and second token period occurs later than the first token period, and
generating a first repeated result by repeating the first token packet during the first token period;
providing the first repeated result to the first peripheral device via the first transmission path and providing the first repeated result to the second peripheral device via the second transmission path;
generating a second repeated result by repeating the second token packet during the second token period; and
providing the second repeated result to the first peripheral device via the first transmission path and providing the second repeated result to the second peripheral device via the second transmission path.

10. The transmission method as claimed in claim 9, further comprising:
generating a first analyzed result after analyzing the first token packet;
generating a second analyzed result after analyzing the second token packet;
comparing the first analyzed result with the second analyzing result; and
disabling the second transmission path when the first analyzed result matches with the second analyzed result.

11. The transmission method as claimed in claim 10, further comprising:
storing the second analyzed result and information relating to a downstream port of the transmission system when the first analyzed result does not match with the second analyzed result, wherein the downstream port is coupled to the second peripheral device.

12. The transmission method as claimed in claim 9, further comprising:
receiving a first handshake packet via the first transmission path during a first handshake period occurring later than the first token period;
generating a first analyzed result by analyzing the first token packet; and
storing the first analyzed result and information relating to the first transmission path transmitting the first handshake packet.

13. The transmission method as claimed in claim 9, further comprising:
performing data communication between a host and the first peripheral device via the first transmission path during a first data period,
wherein the first data period occurs later than the first token period and prior to the second token period.

14. The transmission method as claimed in claim 9, further comprising:
receiving a third token packet;
analyzing the third token packet; and
enabling the second transmission path when the third token packet comprises information corresponding to the second peripheral device.

15. The transmission method as claimed in claim 9, further comprising:
disabling the first transmission path and the second transmission path when the second token packet comprises information corresponding to the transmission system.

16. The transmission method as claimed in claim 9, wherein the first transmission path is enabled when the upstream port receives the first token packet or the second token packet.

* * * * *